Jan. 12, 1965 J. ROSENBERG 3,164,909
AUTOMATIC GAUGING SYSTEM
Filed Jan. 14, 1959 6 Sheets-Sheet 1

INVENTOR.
JACK ROSENBERG
BY
ATTORNEYS

Jan. 12, 1965   J. ROSENBERG   3,164,909
AUTOMATIC GAUGING SYSTEM
Filed Jan. 14, 1959   6 Sheets-Sheet 2

INVENTOR.
JACK ROSENBERG
BY Lyon+Lyon
ATTORNEYS

INVENTOR.
JACK ROSENBERG
BY Lyon & Lyon
ATTORNEYS

United States Patent Office 3,164,909
Patented Jan. 12, 1965

3,164,909
AUTOMATIC GAUGING SYSTEM
Jack Rosenberg, Pacific Palisades, Calif., assignor, by mesne assignments, to General Electric Company, a corporation of New York
Filed Jan. 14, 1959, Ser. No. 786,776
4 Claims. (Cl. 33—174)

This invention relates to electrical control systems for automatically controlling the operation of a machine tool and, more particularly, to improvements for obtaining an automatic gauging operation.

It is customary machine-shop practice to gauge a workpiece after machining to insure that it meets the specifications for its dimensions. Such gauging is a painstaking, time-consuming operation. A large part of the cost of the manufacture of a precision part is the cost of the gauging process. Gauging is usually a manual operation and requires the services of a skilled technician.

An object of this invention is the provision of a machine for automatically performing gauging operations.

Another object of this invention is the provision of an automatic gauging machine for reducing the time required for gauging parts.

Yet another object of this invention is the provision of an automatic gauging machine for reducing the cost of the production of parts.

In Patent No. 3,063,311 entitled Control System, granted to Howard W. Beckwith and Robert E. McCoy on November 13, 1962, there is described and claimed apparatus whereby a multiple-spindle automatic drill press may be controlled from information stored in a record, such as holes punched in paper tape. The usual type of automatic drill press has a table upon which a workpiece is fastened. The table is mounted to be driven along one axis by rotation of one lead screw and along the axis at right angles thereto by rotation of a second lead screw. Means are provided for selecting one of the multiple spindles. When the part of a workpiece in which a hole to be drilled is positioned under the spindle, the spindle is lowered, the drilling operation occurs, and then the spindle is raised. The control system utilizes information punched in the paper tape, indicative of the desired position for the machine-tool table to control motors which drive the lead screws to the end that the workpiece be positioned as desired.

The control system apparatus has been built and is being marketed as an automatic point positioner. It is found that that apparatus provides an extremely precise operation. The precision is such that by modifying that apparatus in accordance with this invention, an automatic gauging system may be obtained. To this end, instead of a drill being inserted in each spindle, there is mounted a sensing transducer. This may be of any suitable type, such as the type known as a differential transformer, or a type actuated by air pressure. The data on the input punched paper tape, consisting of a desired $x$ and $y$ co-ordinate position for the machine-tool table, as well as which spindle to select and lower, remains the same. However, when arriving at a desired position, instead of a drilling operation being performed, after the spindle is lowered a predetermined amount, control of the machine-tool table along the co-ordinate for which gauging information is sought is taken over by the sensing transducer output.

When the sensing transducer output becomes a null, indicative of achieving a desired sensing contact with the object being gauged, a printer, or other indicating device, is actuated to record the position of the workpiece. This information is obtained from positional transducers which are mounted on the respective $x$ and $y$ lead screws driving the machine-tool table. After this printout operation, the machine-tool table is moved back to the position at which the spindle was first lowered, and the spindle thereafter is returned to its starting position. The tape is then actuated to provide the data for the next gauging operation.

The various spindles have mounted therein feeler gauges, or sensing transducers, of the general type indicated, which have various different attitudes. This enables a workpiece to be approached from any one of four sides, as well as from above. The direction of spindle travel may be considered the $z$ axis, and this $z$-axis co-ordinate may be fixed for any sequence of gauging operations. If three co-ordinate gauging is desired, there may be provided a positional transducer and all other controls required for an independent $z$-axis positioning and gauging operation.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
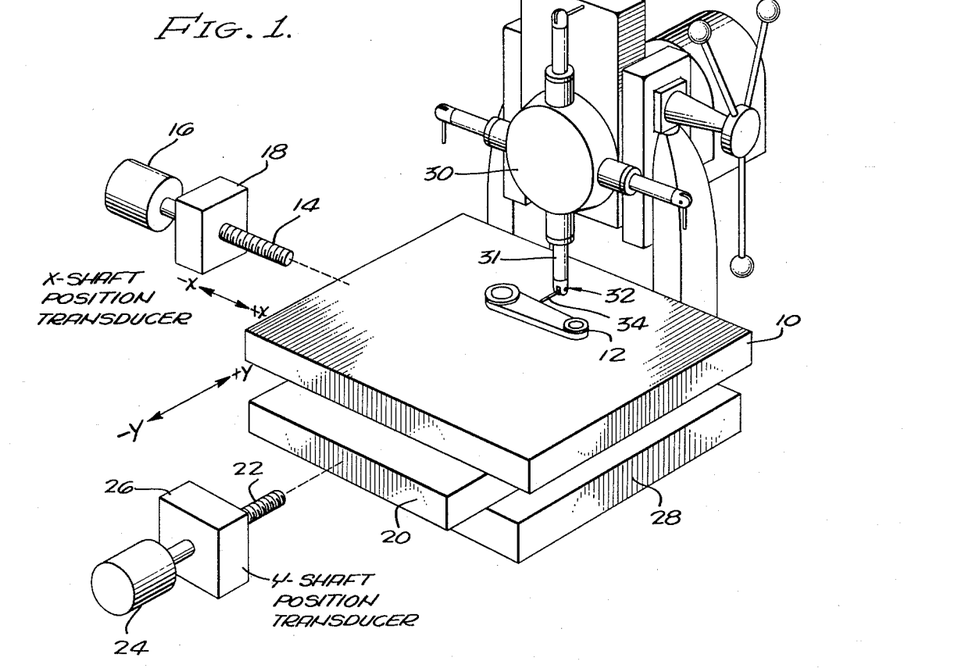
FIGURE 1 shows an automatic drill press modified in accordance with this invention.

FIGURE 1 is a view of an automatic drill press, shown to assist in an understanding of the invention. This will include a bedplate 10, upon which an object 12, which has been machined, is mounted. A lead screw 14 can move the bedplate forward or backward along the $x$ axis when driven by a motor 16. The position transducer 18 is mounted upon the lead screw and is moved thereby to indicate the position along the $x$ axis which the bedplate 10 occupies with reference to an origin point.

The bedplate rides over a saddle 20, which itself can be moved backwards and forwards along a $y$ axis. The saddle 20 is driven from a lead screw 22, which in turn is driven from a motor 24. Mounted on the lead screw is a $y$-shaft position transducer 26, which indicates the position of the slide along the $y$ axis from an origin point. The saddle 20 is supported on the base 28, along which it slides.

Figure 2:
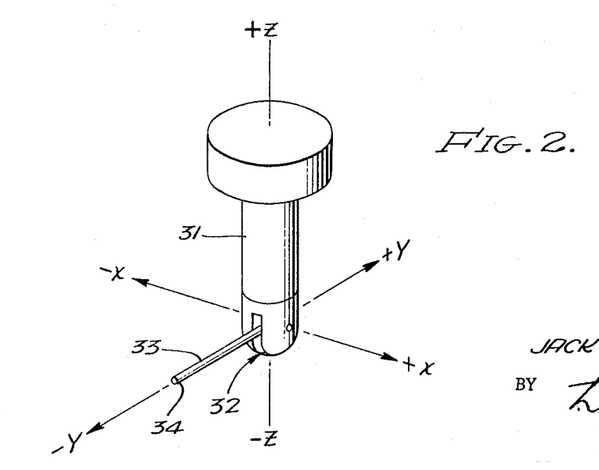
FIGURE 2 is an isometric view of a suitable type of sensing transducer for use in the invention.

The multiple spindle turret 30 is supported above the table 10 and can be lowered from its at-rest position a desired predetermined amount in accordance with the adjustments usually provided with these machines. These machines also usually include a motor and controls, whereby any one of the spindles 31 supported by the rotating turret 30 can be indexed into drilling position. Instead of carrying a drill or other cutting tool, however, each spindle will carry a sensing transducer 32, which has a feeler probe 34, which can be oriented in any one of five directions. As shown in FIGURE 2, these five directions are identified as $-x$, $+x$, $-y$, $+y$, and $-z$. Each one of the four spindles will have a feeler probe 34 oriented in a different one of these directions. In this manner, in one mode of operation the table may first be positioned so that a spindle is at one side of the part to be gauged. The table is then moved to bring the part to be gauged in contact with the sensing transducer. By selecting the orientation of the probe 34 of the sensing transducer, the finished part may be gauged from all five directions.

Figures 3, 4:
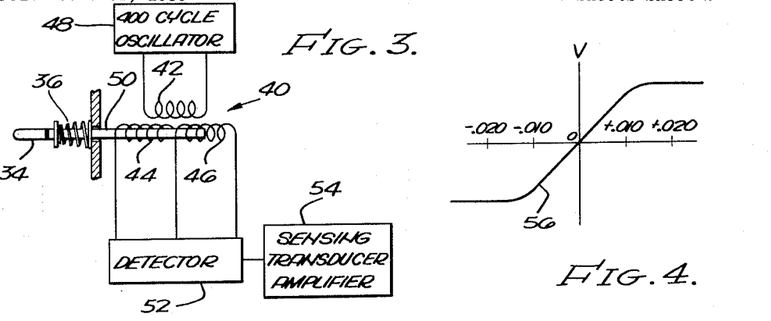
FIGURE 3 is a circuit diagram illustrating a type of sensing transducer suitable for use in the embodiment of the invention.
FIGURE 4 is a characteristic curve of a sensing transducer shown in FIGURE 3.

Referring to FIGURE 3, there may be seen a circuit diagram of one type of sensing transducer which is suitable for utilization herein. This includes a differential transformer 40, having a primary winding 42 and two secondary windings 44, 46. The primary winding 42 is excited from the 400-cycle oscillator 48. The secondary windings 44, 46 are differentially wound so that either in the absence of a movable core 50 or when the core is inserted equally in these windings, the amplitudes of the voltages induced in the secondary windings will be opposite and equal, and a detector 52 will provide zero-output voltage to a sensing transducer amplifier 54. The movable core 50 is biased by a spring 36, which is attached to a side of the housing of the device to cause the probe 34, attached to one end of the core to extend whereby the core is unequally inserted in the two secondary windings. Thus, in the absence of anything pushing the probe end, there will be a voltage detected of a given polarity which is applied to the sensing transducer amplifier indicative of the face that an unbalance exists. When the probe end is pushed to insert the core further into the secondary windings, the amplitude of this detected voltage decreases. Such decrease can continue with further movement of the probe until it attains a zero, or null, point. Further motion of the probe into the differential windings causes a reversal in polarity of the output voltage applied to the sensing transducer amplifier, and it continues to increase in an opposite polarity direction.

Referring now to FIGURE 4, there is shown a characteristic curve for the sensing transducer shown in FIGURE 3. This curve 56 illustrates the variation in the voltage provided by the sensing transducer amplifier with motion of the core 50. It will be seen that this voltage is a maximum and begins to diminish toward a zero value as the core is inserted, so as to be more and more equally positioned in the secondary windings of the transformer. After passing through the zero, or no-voltage point, if the probe continues to be moved, the voltage begins to increase with an opposite polarity. The amount of movement of the probe is plotted as the horizontal co-ordinate.

Figure 5:
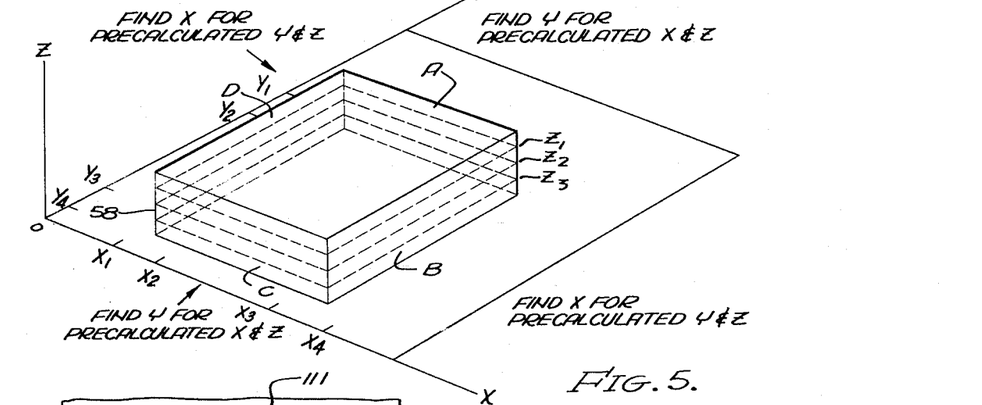
FIGURE 5 is a diagram illustrative of the operation of an embodiment of the invention.

FIGURE 5 is a diagram illustrative of one mode of operation of the invention. When the table of the drill press is at its extreme right-hand and uppermost position, the table then is said to be positioned at the origin point designated as O in FIGURE 5. Assume it is desired to gauge the surfaces A, B, C, D of the piece 58, shown in FIGURE 5. First, the table is moved so that the position $x_2$, $y_1$ is assumed under the spindle. The spindle holding the probe which has an orientation designated in FIGURE 2 as $-y$ is selected. The spindle is then lowered a distance to position $z_1$. It should be noted that points to which the spindle is lowered for gauging are selected around the surfaces A, B, C, D of the part 58. These points are respectively located in FIGURE 5 at the coordinates: $x_2$, $y_1$, $z_1$; $x_3$, $y_1$, $z_1$; $x_4$, $y_2$, $z_1$; $x_4$, $y_3$, $z_1$; $x_3$, $y_4$, $z_1$; $x_2$, $y_4$, $z_1$; $x_1$, $y_3$, $z_1$; and $x_1$, $y_2$, $z_1$. As soon as the apparatus senses that the spindle has attained position $x_2$, $y_1$ and the spindle is lowered to the elevation $z_1$, the motion of the table is directed by the output signal from the sensing transducer. The table then moves until the sensing transducer provides a null signal output. A visual indicator such as a dial may be used to read this, if desired. Also, if desired, printing apparatus may be actuated to print whatever the position of the $x$ and $y$ shaft position transducers are at that time. The table then moves until the spindle is positioned at point $x_3$, $y_1$, $z_1$. The table will then come under the control of the sensing transducer again until a null of the part is reached. At this time, a printout again occurs of the $x$ and $y$ shaft position transducer indications, and control is returned to the apparatus responsive to the punched paper tape instructions.

When the last point on the surface A has been sensed, the table is then positioned for approaching the piece 58 from the direction which contains the surface B. The table moves to a location such as is designated by $x_4$, $y_2$, and the spindle head is directed this time to provide a probe having an orientation represented in FIGURE 2 by the $-x$ direction. This is lowered to the $z_1$ position. At this time, the control of the table is again under the sensing transducer, which moves the table until a null is obtained. Thereupon, a printout occurs of the $x$ and $y$ shaft position transducers indications.

After the dimensions around the part 58 have been obtained for the elevation $z_1$, then the second gauging operation can occur with the same $x$ and $y$ positioning data, except that the $z$ value, or setting of the travel of the spindle is changed to another value $z_2$. In this manner, a complete gauging operation on all four surfaces can be quickly and automatically obtained. In order to obtain the dimensions for the remaining two surfaces, the position of the part 58 may be altered so that any one of the surfaces already gauged is next to the table. The table can then be programmed to enable gauging of the remaining two surfaces in the manner described. The actual dimensions of the part can be obtained by subtracting the readings obtained on opposite surfaces of the part. It may be preferred to clamp a part to a reference position on the table, whereby the coordinate data provided by the position transducers provide dimension data without subtraction. The part can also be mounted in a turnover jig, whereby when it is desired to gauge a lower surface the part is turned over without disturbing its table location.

Figure 6:
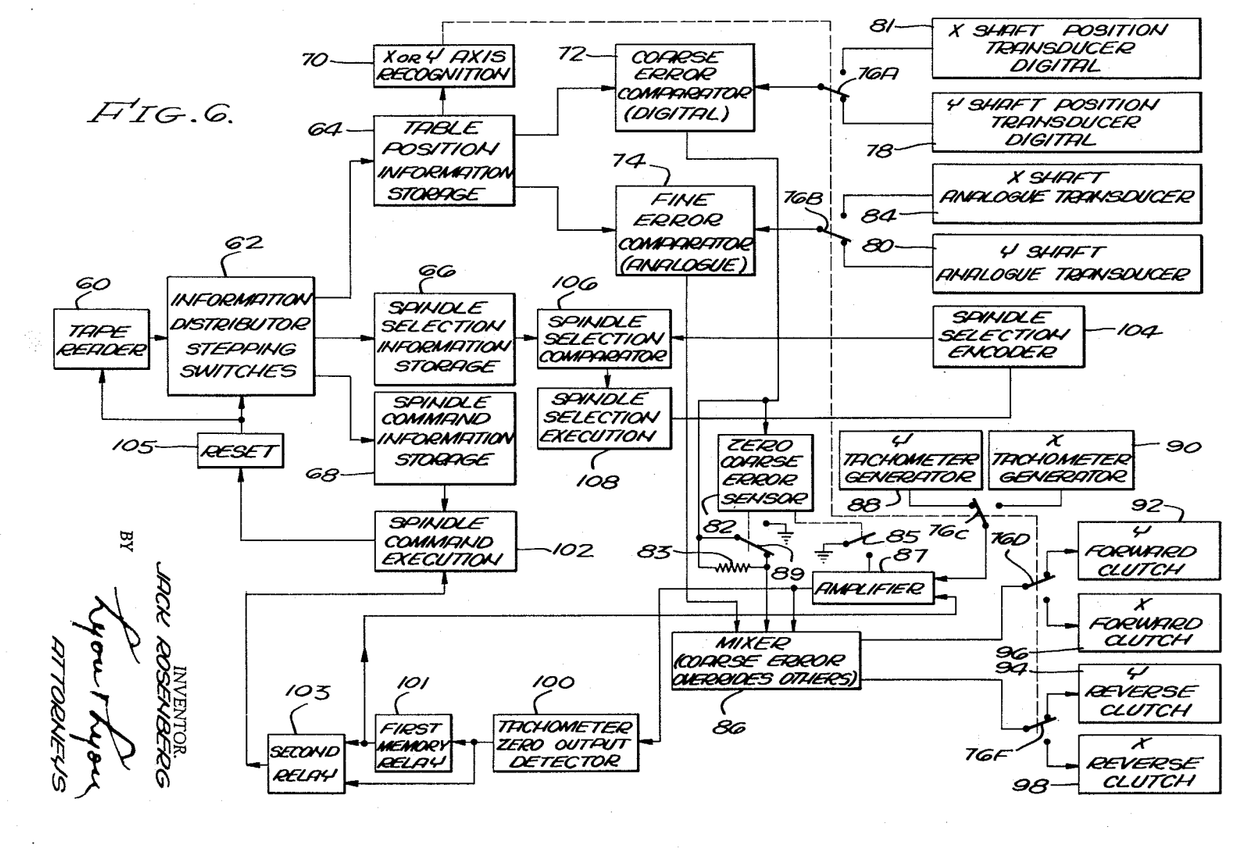
FIGURE 6 is a block diagram of a control system shown to assist in an understanding of this invention.

In order to achieve a better understanding of the operation of this invention, it is necessary to understand the operation of the control system which is described and claimed in the previously mentioned patent by Beckwith and McCoy. FIGURE 6 herein comprises a block diagram of that invention and corresponds to FIGURE 2 of the aforesaid patent. Information for directing the motion of the table to the various desired positions is recorded in the form of $x$ and $y$ dimensions from the origin position. These $x$ and $y$ dimensions or distances are recorded on paper tape. The data is laid down in the form of blocks of information on the paper tape. Each block contains in code an indication of the desired one of the many spindles required for the operation to be performed, an indication as to whether the following co-ordinate number was for $x$ or for $y$, then the co-ordinate number of the value itself, and thereafter a drill or no-drill instruction to the spindle. For the present invention, the instruction "do not drill after reaching position" is used. The tape reader 60, represented by the rectangle in FIGURE 6, is a commercially purchasable reader for punched-hole tape and reads the information in the one-block-at-a-time format. An information distributor 62, which effectively comprises stepping switches, distributes the information in the tape block which is read, respectively to a table-position information storage register 64, to a spindle-selection storage register 66, and to a spindle-command information storage register 68. The tape reader stops reading as soon as a block of information has been read.

The first operation to be performed is in response to the table-position information storage. Apparatus is provided, identified by the rectangle 70, which performs the function of recognizing the axis for which the information in the table-position information-storage register is to be used. Upon such recognition, relays are operated to connect either the x-position transducers on the lead screws or the y-position transducers on the lead screws to a coarse-error comparator 72 and a fine-error comparator 74, which compares the lead-screw positional information with the information in the table-position information storage 64.

The data in the table-position information storage will comprise a binary-coded number whose value is given digit-by-digit in the range from the tens digit position down to the thousandths-of-an-inch position. Values which are 0.020 of an inch or greater are considered coarse values; values between 0.020 and 0.010 are an overlap region; and values which are less than 0.010 of an inch are considered fine values. Thus, the table-position information-storage register 64 will have two outputs. One of these is applied to the coarse-error comparator 72 and will consist of the coarse values of the positional information. The other output of the table-position information-storage register is the fine-error information and is applied to the fine-error comparator 74. In the overlap region, outputs are applied to coarse- and fine-error comparators.

Two types of positional transducers are coupled to each lead screw. One of these is a digital positional transducer and provides an output consisting of a digital representation of the position of the table with respect to its origin. The other transducer is an analog transducer, and this provides an accurate indication of the position of the table between each one-tenth of an inch distance. Thus, it will be seen that the digital positional transducer provides coarse-error information, and the analog positional transducer provides fine-error information. The x or y axis recognition circuit 70 controls switches which will connect to the respective coarse- and fine-error comparators, whichever one of the transducers corresponds to the information recognized from what has been read from the tape. The switches 76A, 76B, 76C, 76D, and 76F, in the position shown in the drawings, will apply y-axis positional information from the respective y-shaft position transducer 78 and the y-shaft phase-shifting resolver 80 to the respective coarse-error comparator and fine-error comparator. The respective x-shaft position transducer 81 and the x-shaft analogue transducer 84 are not connected to the comparator at this time.

The output of the coarse-error comparator 72 is an error signal which occurs whenever there is a difference between the digital information which is in the table-position information-storage register 64 and the digital information supplied from the y-shaft position transducer 78. This error signal is applied to a zero coarse-error senser 82, which, as long as a coarse error is sensed, in effect maintains a first set of contacts 89 closed to bypass a high-value resistor 83, to directly connect the output of the coarse-error comparator to a mixer 86. The coarse-error senser 82 also maintains a second set of contacts 85 open until no further coarse error is sensed, whereupon these contacts are allowed to close. When the contacts 85 close, they increase the gain of an amplifier 87, to which they are connected.

The output of the fine-error comparator 74, consisting of a difference between the positional information provided by the y-shaft phase-shifting resolver 80 and that derived from the storage register 64 is applied directly to the mixer input. In addition to these two inputs, a third input is applied to this mixer. This consists of a voltage derived from either a y-tachometer generator 88 or an x-tachometer generator 90. The voltage from the switched-in tachometer generator is applied to the mixer through the amplifier 87. The tachometer generators are respectively operatively coupled to the y and x lead screws, which drive the table of the machine tool. The one of these that is selected is determined by the operation of the x or y axis recognition circuit 70. Switch contacts 76C are actuated accordingly.

The voltage generated by the tachometer generators is applied to the mixer to oppose the signals obtained from the coarse-error comparator and the fine-error comparator. However, the amplitude of the signals is controlled in a manner so that the coarse-error signal overrides all other signals. Thus, as long as there is a coarse error, the mixer circuit 86 senses its polarity and, in response thereto, will cause to be operated either a y-forward clutch 92 or a y-reverse clutch 94. The switch contacts 76D and 76F are also positioned by the operation of the x or y axis recognition circuitry 70, so that the proper one of the clutches (x or y axis) will be energized by the output of the mixer. The x-forward clutch bears reference numeral 96, and the x-reverse clutch is designated by the reference numeral 98.

The machine-tool table is rapidly moved in the direction which reduces the coarse-error signal to zero. At this time, there is no coarse-error signal being applied to mixer 86. Since, however, the table motion cannot be instantaneously arrested, the tachometer generator output voltage is controlling at this time and energizes the reverse clutch, whereby the table motion is attempted to be reversed. The table will skid through the zero coarse-error region which occurs over a range of plus or minus 0.020 inch, is then stopped, and its motion is then reversed, due to the coarse-error signal. The zero coarse-error sensor 82 is designed not to operate rapidly, and thus the table will pass through the zero coarse-error region too fast the first time for the zero coarse-error sensor to fully react.

When the table comes to a stop before being reversed, the tachometer generator output voltage will drop to zero. This is sensed by a tachometer zero-output detector circuit 100, which is coupled to the amplifier 87. The tachometer zero-output detector circuit 100 operates a first memory relay 101, which latches to store the fact of the first table stop. As the table reverses its motion, the zero coarse-error region is quickly reached. In this region, the zero coarse-error senser 82 can operate contacts 89 and 85 to prevent further input to the mixer from the coarse-error comparator, and by closing contacts 85 can increase the gain of amplifier 87. Contacts 89 are switched to ground to short out the output of the coarse-error comparator and to insert the high-value resistor in the circuit, to thereby cut off the coarse-error signals at this time. The amplitude of the tachometer generator output voltage being applied to the mixer 86 is increased. This voltage opposes that received from the fine-error comparator 74, with the result that the speed at which the machine-tool table is driven in response to the resultant of the two voltages is much less than it would have been without the increased tachometer generator voltage.

Since the table is now moving slower and slower under control of the difference of the two voltages, it can be stopped substantially instantaneously at the position at which the fine-error comparator output drops to zero. A second memory relay 103, which was set up by operation of the first memory relay 101, can now be operated by the tachometer zero-output detector 100. The operated second memory relay 103 then enables the spindle-command execution apparatus 102 to drill (or not, as instructed by the data in the spindle-command information storage), following the completion of which reset apparatus 105 can reset the system to receive the next block of data.

It should be noted that the selection of the proper spindle for drilling may be made during the time that the table is being positioned. Thus, the spindle-selection information-storage register 66 has the data therein compared with the data of the actual spindle position. This is a function of the spindle-selection encoder 104, which is a set of contacts on the spindle turret which establishes a code representative of whichever spindle is in operating position. If there is a difference, then the spindle-selection comparator 106 applies an output signal to apparatus designated by the rectangle 108 and called the spindle-selection execution. This represents circuitry whose function is to energize spindle-selection apparatus to rotate the turret of the machine tool until the spindle-selection encoder indicates that the desired spindle is in operating position. The reset circuit resets the information distributor, stepping switches, as well as all the relay storage registers, and thereafter instructs the tape reader 60 to proceed to read the next block of information.

Figure 7:
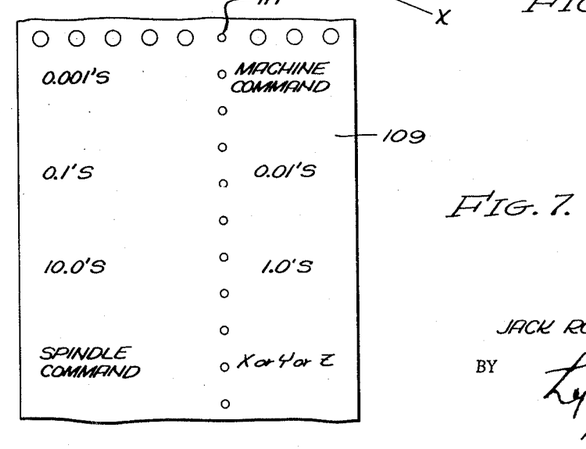
FIGURE 7 illustrates a block of data stored on tape in accordance with this invention.

FIGURE 7 shows a typical layout of the block of data on tape 109 for the purposes of this invention. It should be here noted that this layout is identical with the layout of the tape in the previously mentioned Beckwith and McCoy patent. The tape 109 may be either magnetic or punched paper tape. In the embodiment of the invention, punched paper tape is used consisting of eight-hole tape, with a ninth hole 111 which serves as a driving hole. The code employed for storing data comprises four binary bits per data word, so that two data words are stored on each row of holes. In the block on the tape, the data is stored in accordance with the arrangement shown, so that in side-by-side fashion the presence or absence of four holes represent the spindle condition and the presence or absence of the remaining four holes represents whether the motion resulting from the instructions is to be along the $x$ or $y$ axis, or along the $z$ axis where three-axis independent control is desired. The next row of holes above the spindle-command location provides the desired position of the table from the origin in tens of inches; the adjacent four holes represents the desired position of the table from the origin in units inches. Above these positions the presence or absence of holes provide, above the tens-of-inches position and the units-of-inches position, respectively the tenths and hundredths of inches distance. The fourth row of holes in the block provides thousandths of inches distance information and information representative of the machine command or the fact that this particular block of information is to be disregarded, since an error has been made. In may be correctly surmised that the table distance desired from the origin is expressed on the punched paper tape in a binary coded decimal form.

The spindle-condition information indicates in this invention not which spindle is desired for drilling, but which spindle is desired with the probe having the attitude required for the desired approach to the part to be gauged. The machine-command information indicates what operations the machine is to carry out when the table has reached its destination. Thus, the spindle can be instructed to stay down at the gauging level until the complete side of the piece being gauged is finished, at which time it can be withdrawn.

Figure 8:
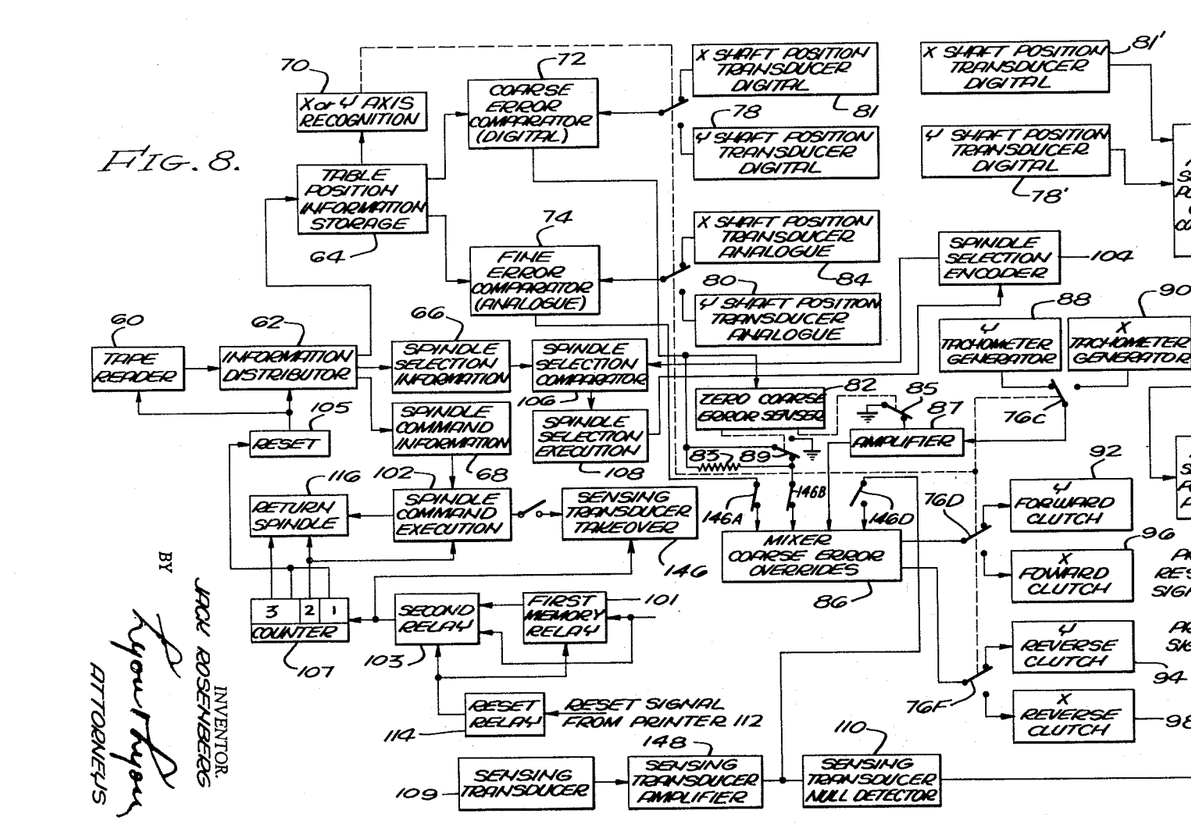
FIGURE 8 is a block diagram of an embodiment of the invention.

As previously pointed out, the block diagram described in FIGURE 6 is that for the embodiment of the invention described in the Beckwith et al. patent for a Control System. The modifications of that system, in accordance with this invention, are shown in FIGURE 8. Apparatus performing functions identical to those described in FIGURE 6 bear the same reference numeral as previously.

Thus, the tape reader 60 has one block of information consisting of four rows of tape data read out and distributed by the information distributor 62. The machine-tool table is then moved along one co-ordinate to the position indicated by the data just read out. When the second relay 103 is operated, a counter 107 having a three-count capacity is set in its first count state. The first count-state output is applied to the reset apparatus 105, which operates to clear the apparatus for receiving the information in the next block of tape. The tape is then advanced to the next block and the information distributor distributes the information contained therein. The machine-tool table will then move along the other co-ordinate to a location indicated by the information just read. When the positional information provided by the transducers on the feed screws on the machine-tool table and the position called for by the data read from the tape are identical, the machine-tool table comes to a stop and the spindle which has meanwhile been selected is lowered a distance previously set into the spindle feed-control mechanism. The operation of the second relay advances counter 107 to its second count state.

The operation of the system thus far, except for the presence of the counter 107, is substantially identical with that of the apparatus described in the patent for Control System, by Beckwith et al., as previously mentioned. However, with this invention, when the spindle lowers toward the machine-tool table, the drill instruction is not given. For operation in accordance with this invention, the relay apparatus in the previous system that signals the drill operation is either rendered inoperative or is omitted. The second count condition of the counter 107 provides an output which instructs the spindle-command execution apparatus 102 to lower the spindle to the drill position. When the spindle is lowered to the desired position, a microswitch on the turret head is operated, which causes relay apparatus, designated as sensing transducer takeover 146, to become operative. This relay apparatus includes two normally closed contacts 146A and 146B, which are in the leads connecting the fine-error comparator and zero coarse-error senser outputs to the mixer 86. These contacts are opened and normally open contacts 146D are closed by operation of the sensing transducer takeover 146. This contact operation causes the input to the mixer to be derived from the sensing transducer amplifier 148. The one of the tachometer generator outputs previously connected to the coarse-error mixer in accordance with the last co-ordinate instruction read from the tape remains connected to the mixer.

As a result of the above-described operation, the output of the feeler transducer is applied through the mixer to control the motion of the table. The one of the clutches (X or Y) which was last used in moving the machine-tool table to the desired co-ordinate position remains connected to the mixer. The programming on the punched paper tape of the desired co-ordinate motions should be such that the last co-ordinate recorded on the tape prior to the sensing or gauging activity should be the one along which motion will bring the sensing head into contact with the workpiece. Thus, considering position $x_2$, $y_1$, $z_1$, in FIGURE 5, motion along the $y$ axis is required to bring the sensing head in contact with the workpiece. Furthermore, $y$ is the unknown co-ordinate. Considering points $x_4$, $y_2$, $z_1$, motion along the $x$ axis is required to bring the sensing head in contact with the finished workpiece. Furthermore, the unknown co-ordinate there is the $x$ co-ordinate. Accordingly, in programming the data punched into the paper tape, the last co-ordinate recorded for each two blocks of data should be the one for which gauging data is actually required at the point under consideration. This insures that the clutches connected to the mixer are the ones which will operate the machine-tool table to bring the sensing head or transducer in contact with the finished piece of work for the gauging operation.

The output of the sensing transducer amplifier will accordingly move the machine-tool table until the sensing transducer null detector 110 detects a null. The tachometer generator output is also applied to the mixer to insure that the speed of motion at this time is not excessive. The output from the sensing transducer begins to decrease from the time the sensing head touches the workpiece until the null condition is established. This automatically reduces the speed of the machine-tool table at this time.

When the sensing transducer null detector 110 senses a null point, a print signal is applied to an $x$, $y$ shaft position printer 112. This printing apparatus exemplifies any suitable display and/or recording arrangement, which are operative responsive to transducer output signals. This printing apparatus is fed continously the shaft-position data from a second set of transducers 78', 81', driven simultaneously with the first set of transducers. The second set of transducers feed an $x$, $y$ shaft-position code converter 113. The second set of transducers, or shaft-position encoders may be the same as the first set 78, 80, 81, 84, used for positioning the table. However, a preferable combination of transducers, decoder, and shaft-position printer is a commercially purchasable item. The transducers and decoder are sold by the Gianini Company, and are known as the Gianini-Datex encoder. The output printer is sold by the Monroe Calculating Machine Company and is known as a Data/Log. The entire assembly may be obtained from the Monroe Calculating Machine Company. The shaft-position printer provides an output signal when it completes printing the information in response to the print signal. This output signal is termed a printer-reset signal, is utilized to restore control of the motion of the machine-tool table to the usual tape-control apparatus and to inactivate the sensing transducer control. Thus, the reset signal from the printer operates a reset relay 114, which inactivates the sensing transducer takeover 146 as well as first memory relay 101 and second relay 103. Contacts 146A and 146B are now closed, and contact 146D is opened.

At this time, the feeler transducer control has been removed and the apparatus finds itself displaced from the proper position being called for by the information which has been read from the tape. Thereupon, the machine-tool table is moved back to this position under control of the outputs from the fine- and coarse-error sensors. The apparatus operates in its usual manner, and the first memory relay and the second relay are successively operated as the apparatus is returned. The output of the second relay at this time drives counter 107 to its third count condition. The output of counter 107 in its third state is applied to the return spindle apparatus 116, which operates to return the spindle unless instructed otherwise by the spindle-command execution apparatus 107. The third state of the counter also applies its output to the reset apparatus 105. This operates to clear the registers which have stored information read from the tape and actuates the tape reader to read out the next block of information to commence another gauging operation.

Figure 9:
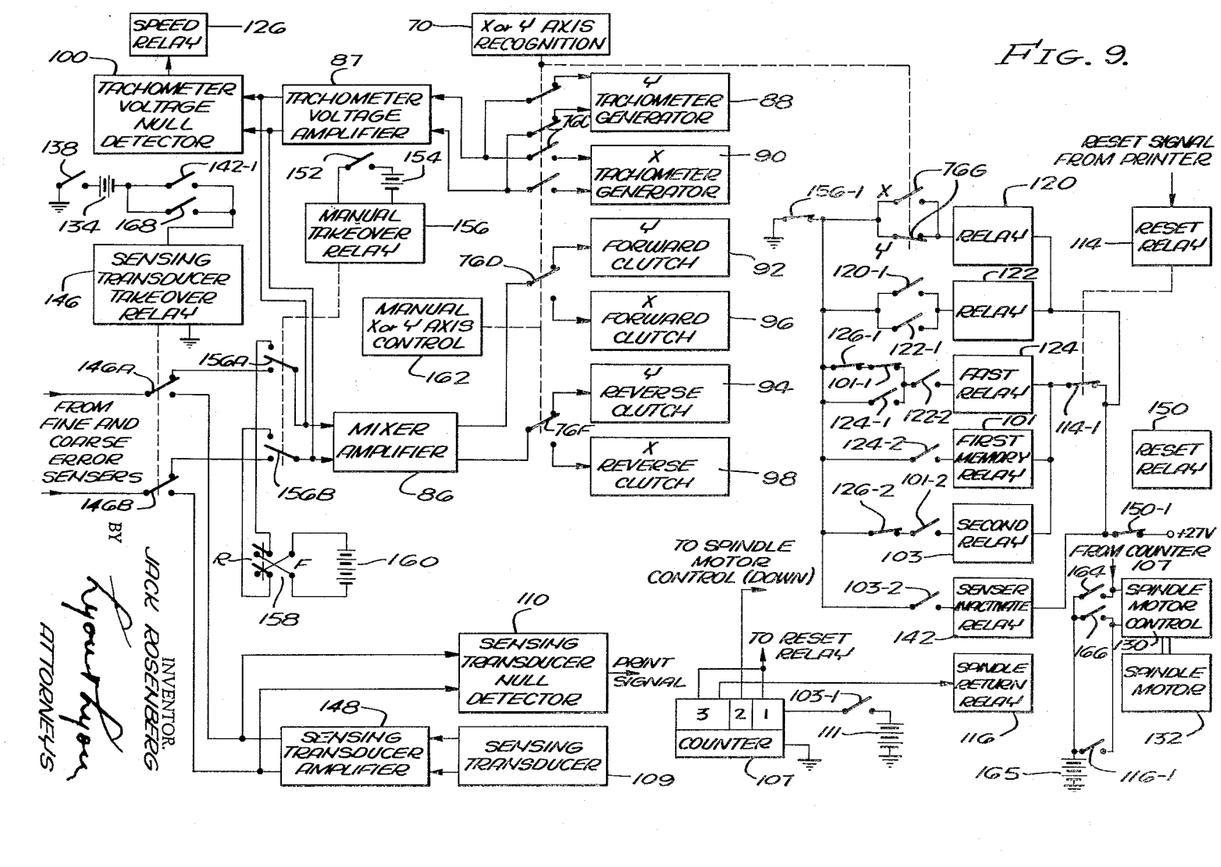
FIGURE 9 provides further details for the embodiment of the invention shown in FIGURE 8.

Reference is now made to FIGURE 9, which shows in more circuit detail the modifications required in accordance with this invention, as was indicated in FIGURE 8. Some of the apparatus shown in FIGURE 9 is identical with that represented in FIGURES 6 and 8, and, accordingly, will bear the identical reference number. For example, the $x$ or $y$ axis-recognition circuit 70, after recognizing the axis called for by the register data, sets the switches 76C, 76D, 76F and 76G to select the $x$ or $y$ apparatus which has been recognized. As shown in the drawing, the $y$ tachometer generator 88 has been selected, the $y$-forward clutch and $y$-reverse clutch, respectively 92, 94, have been selected, and the $y$ contact 76G has been selected. Thereby, a relay 120 has energizing potential applied thereto over a path including the closed $y$ contacts of a switch 76G. This serves to close normally open contacts 120–1, whereby energizing potential can be applied to a relay 122, which is connected thereto. Relay 122 latches itself closed over its contacts 122–1.

A fast relay 124 cannot yet operate over a path including contacts 122–2, which are now closed, and normally closed contacts 101–1, which are now closed, because normally closed contacts 126–1 are now open. The reason contacts 126–1 are now open is because they are assigned to a speed relay 126, which is operated by the tachometer voltage null detector 100 in a manner so that as long as no null signal is detected by the tachometer voltage amplifier 87, the speed relay 126 is operated. As soon as a null is detected, however, the speed relay 126 is rendered inoperative. This happens the first time the machine-tool table comes to a stop in the vicinity of a desired co-ordinate position. Thus, the first time this happens, the fast relay 124 can operate, latching itself closed over its contacts 124–1.

The operation of relay 124 enables the first memory relay 101 to be rendered inoperative over a path including the contacts 124–2, which are normally open but are now closed. The operation of the first memory relay 101 enables the closure of its contacts 101–2. The second relay 103 is selected to be a slow-closing, fast-opening relay, having a closing delay on the order of 60 milliseconds. As a result, the machine-tool table will reverse its motion and attain a speed sufficient to operate speed relay 126 again, before the slow-acting relay 103 can operate. Thus, the second relay 103 will not become operative until speed relay 126 has become inoperative a second time, which happens when the desired $x$ and $y$ co-ordinate position is reached. At this time, the now closed, normally closed speed relay contacts 126–2, enable the second relay 103 to be rendered operative.

The second relay 103 closes its contact 103–1 when it is rendered operative, applying a signal from a potential source 111 to the counter 107 to place it in its first count state. The reset apparatus 105 (FIGURE 8) then operates to prepare the apparatus for its next performance pursuant to data in the next block on the tape. Included is a reset relay 150 which opens its normally closed contacts 150–1 momentarily to release all the relays 120, 122, 124, 101, and 103. The control apparatus then directs the table to move to the next co-ordinate position, attainment of which causes counter 107 to advance to its next count condition. The second counter state provides an output to cause a spindle motor control 130 to energize a spindle motor 132 to lower the selected spindle. When the spindle has been lowered by its motor 132 to the predetermined position, a microswitch 138 is closed. This causes the transducer takeover relay 106 to be energized from the source of potential 134, over a path including now-closed, normally open contacts 142–1. Relay 142 is operated over contacts 103–2 when relay 103 is operated. The double-pole, double-throw contact pair 146A, 146B, associated with the sensing relay 146 are actuated to connect the input to the mixed amplifier from the fine- and coarse-error sensers to the output of the sensing transducer amplifier 148. The sensing transducer 109 is now providing a voltage to its amplifier 148, the output of which, in turn, is applied to the mixer amplifier 86, where it is mixed with the output of the tachometer voltage amplifier 87. The mixer amplifier will energize either the forward or the reverse clutch, depending upon the polarity of the resultant voltage which enables the table to move in a direction to bring the sensing transducer in contact with the finished part being gauged.

When the sensing transducer null detector 110 senses a null, the printer 112 is actuated as previously described to print out the position of the table as determined from the transducers on the table drive shaft. The printer then also provides an output signal, which momentarily energizes a reset relay 114. This relay opens its normally closed contacts 114–1 to thereby open the energization path for the fast relay 124, the first memory relay 101, and the second relay 103. Normally open contacts 103–2 are now opened, thus rendering inoperative relay 142, whereby the sensing transducer takeover relay is rendered inoperative. The momentary operation of the reset relay from the output signal of the printer thus renders the fast-relay, first memory relay, second relay, and sensing transducer takeover relay inoperative. The double-pole, double-throw contacts 146A, 146B return the input connection of the mixer amplifier 86 to the output of the fine- and coarse-error sensers 74, 82.

Since in view of the present position of the machine-tool table an error signal is being provided, the table will be returned to the co-ordinate position called for by the data on the punched paper tape. The relays 124, 101, and 103 then go through the same operating procedure as previously described in returning the machine-tool table to the position called for by the punched tape. The third operation of the second relay 103 advances the counter 107 to its third count condition. This energizes the main reset relay 150. Relay 142 will not be energized before the energization of the spindle-return relay 116 by the third counter state. Thereby, the mirco-switch 138 opens before contacts 142–1 can be closed.

The apparatus is now in condition for the next gauging operation. The reset apparatus 105 automatically clears the registers and advances the tape to the next data block.

It may be desirable to operate the apparatus for the purpose of gauging the finished workpiece without programming the x and y positions after which the sensing transducer takes over the operation of the system. This mode of operation is a partially manual one and enables the manual positioning of the machine-tool table with a printout occurring when the sensing transducer null detector senses a null condition.

Referring again to FIGURE 9, in order to have the manual or "jog" button type of operation of the system, first a switch 152 is closed, thereby applying energizing current from a supply 154 to a manual take-over relay 156. This relay thereby opens its normally closed contacts 156–1, whereby the ground circuit is opened and the relays 120, 122, 124, 101, 103, and 142 are prevented from operating. The manual take-over relay 156 also operates a pair of double-pole double-throw contacts 156A, 156B to connect the input of the mixer amplifier 86 to a reverse-forward switch 158. The switch can be used to apply a signal voltage of either polarity from a potential source 160 to the input to the mixer amplifier 86. The selection of co-ordinates along which the table will move is made by a manual take-over x or y axis control 162 which can manually position contacts 76C, 76D, and 76F. Alternative to this, an auxiliary and parallel set of contacts to contacts 76C, 76D, and 76F may be provided for performing this manual selection operation. The mixer amplifier will respond to the input voltage exactly as if it were receiving a signal from either of the error sensors. Before operating the reverse-forward switch 158, the switch control designated as the manual x or y axis control 162 is operated to connect the contacts 76A through F to their respective x or y shaft transducers, generator forward clutch and reverse clutch, along whichever co-ordinate motion is desired. Manual switches 164, 166 respectively are connected to apply potential from a source 165 for manually directing the spindle to be moved down into sensing position and thereafter to be returned. By opening switch 158 and closing the manual take-over switch 168 when the table has been moved to its desired co-ordinate position and the spindle has been lowered to the desired sensing level, the apparatus will operate under the control of feeler transducer as in the automatic mode to advance the table until the feeler transducer null is detected. At this time, however, it is necessary to again open the manual take-over relay and by means of the switch 158 apply a potential of proper polarity to move the feeler transducer away from the workpiece. For each point at which a gauging measurement is printed out, it may be desired to also print information as to the limits at that point. To perform such an optional operation, it is necessary to record these limits for each block of data on the tape, read these limits out of the tape, and store them in a register, which can thereafter operate the printer each time a feeler null signal is detected to print the limit information following the printing of the transducer position data.

The two-axis automatic-gauging system described may be extended to a three-axis system by the provision of a shaft or positional transducer on the spindle shaft, which provides an output signal representative of the z co-ordinate position of the sensing transducer on the spindle. Three axis tables are known and commercially purchasable wherein z-axis motion occurs as a result of the machine-tool table moving along the z axis, and not the spindle being lowered. It will be appreciated that with this arrangement another shaft positional transducer is required, another tachometer, another set of reverse-forward clutches, etc.

Figure 10:
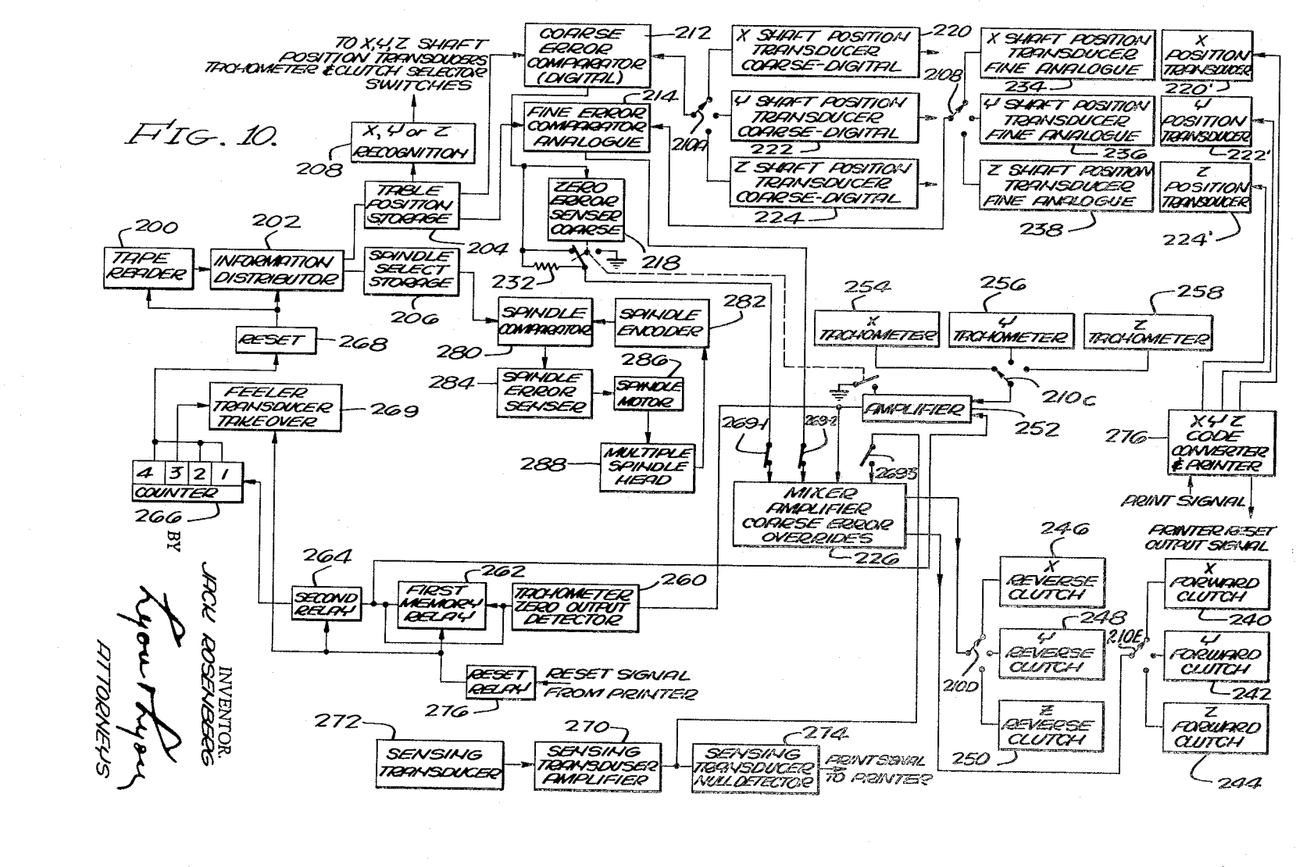
FIGURE 10 is a block diagram of a three-axis automatic gauging system in accordance with this invention.

FIGURE 10 shows a block diagram of a three-axis control arrangement in accordance with this invention for performing an automatic gauging operation. In the punched tape there is provided data for x, y, and z axis position, as well as for the selection of the spindle holding the sensing transducer with the desired gauging attitude. This data is read by the tape reader 200 into an information distributor 202. The information distributor 202 properly steps this information into two registers comprising a table-position storage register 204 and a spindle-selection storage register 206. This apparatus may be identical with that previously described. The table-position storage register 204 provides its information to an x, y, or z recognition circuit 208. This circuit actuates switch connections 210A, 210B, 210C, 210D, and 210E, in accordance with the axis which has been recognized in the register 204. The recognition apparatus 208 actuates these three-position switches 210A through 210E to respectively select the proper co-ordinate position transducer which is mounted on the shaft and which provides digital information of shaft position, the proper co-ordinate position transducer mounted on the shaft which provides fine analog positional information, the proper co-ordinate tachometer, and the proper co-ordinate forward and reverse clutches.

The table-position storage register 204 also provides table-position information to a coarse-error comparator 212 and to a fine-error comparator 214. These are identical comparators, as were described for the two co-ordinate embodiments of the invention. As in the former described operation of the system, the coarse-error comparator compares the table-position information in the storage register 204 with the table-position information as provided by the x or y or z shaft position transducer either 220 or 222 or 224, which has been selected by the recognition circuit 208.

An error signal, representative of the result of the comparison, is applied to a zero coarse-error sensor and to a mixer amplifier 226. The zero coarse-error senser maintains a set of contacts 230 in position to bypass a resistor 232 which is in series with the input to the circuit of the mixer amplifier 226. When the coarse-error comparator output drops to zero, the zero coarse-error senser 218 moves the contacts 230 to ground the coarse-error comparator output and to insert the resistor 232 in the input circuit of the mixer amplifier 226 from the comparator.

The fine-error comparator 214 compares the table-position information stored in the register 204 with analog information provided by one of the three shaft-position transducers 234, 236, 238 which has been selected by the axis-recognition circuit 208. The resultant error signal, which is indicative of the difference between the desired and actual positions of the machine-tool table, is applied to the mixer amplifier 226. The fine-error signal output of the comparator is amplified by the mixer amplifier and is applied to the one of the forward clutches 240, 242, 244, or to the one of the reverse clutches 246, 248, 250 which has been selected by the recognition circuit 208.

An amplifier 252 amplifies the output signal of the one of the three tachometers 254, 256, 258 which has been selected by the axis-recognition circuit 208. This tachometer signal is applied to the mixer amplifier in opposition to the input signals of the coarse- and fine-error comparators. The amplifier output signal is also applied to the tachometer zero-signal output detector 260. The zero coarse-error senser 218 also controls the gain of the tachometer signal amplifier 252 so that gain is high in the presence of a coarse error and is reduced in the presence of a zero coarse-error value. This is achieved by operation of the switch contacts 251, which are open in the presence of a coarse error and are closed when no coarse-error signal is detected.

The mixer amplifier applies the error signal received to the one of the forward or reverse clutches which has been selected. As previously described, these clutches are driven differentially and in the nonactuated condition maintain their respective drive shafts stationary. The application of a signal to one of the clutches de-activates it, whereby the shaft can turn in a direction established by the clutch which has been de-activated.

As before, when the machine-tool table first approaches the co-ordinate position called for by the information in the table-position storage register 204, it will skid through this position, stopping and then reversing. The first motion reversal will cause the tachometer zero-output detector to become actuated by the fact that the tachometer output voltage has dropped to zero. This will enable a first memory relay 262 to operate to store this information. The first memory relay 262 lays down a path for the second relay 264, whereby the return motion with the consequent stopping of the machine-tool table at the desired co-ordinate position will enable the second tachometer zero-output detector operation to cause the second relay 264 to be operated.

When relay 264 is operated, it applies an output to a counter 266. This counter has four count conditions. In response to the input from the second relay 264, it is enabled to enter its first count condition. The output is applied to a reset apparatus 268 for the system, whereby the information distributor is reset and the tape reader is instructed to proceed to read out the next block of data.

The next block of data provides information for directing the motion of the machine-tool table along a second axis. The machine will operate pursuant to the information entered in the table-position storage register 204 along this second axis in the same manner as it operated pursuant to the data provided in the first block of data read from the tape by the reader 200. When the machine-tool table is positioned in accordance with the information contained in the second block of data, the second relay provides an output which advances the counter 266 to its second count condition. This again operates the reset apparatus 268, whereby the system is actuated to receive and operate on the data read out for directing motion along a third co-ordinate axis. When this is achieved, the second relay 264 will advance the counter 266 to its third count position.

It will be appreciated that at this time the machine-tool table has moved to the $x$, $y$, and $z$ co-ordinate positions called for by the data read from the magnetic tape by the tape reader 200. A third state of the counter 266 actuates a feeler transducer takeover relay 268. This enables the two normally closed contacts of the relay, namely, 269-1 and 269-2, to be opened, and a third normally open contact pair of the relay 269-3 to be closed. The result of this operation is to enable the control of the apparatus to be transferred to the output of the sensing transducer amplifier 270. The sensing transducer 272 applies output signals to the sensing transducer amplifier 270 until it comes in contact with the workpiece being gauged and moves to its null position. When the null position is achieved, the feeler transducer null detector 274 provides an output signal to the shaft-position printer 276, which, in response to the data provided from separate $x$, $y$, and $z$ position transducers, prints out the co-ordinate values at that time. It will be appreciated that the sensing transducer output takes the place of the coarse-error comparator output and the fine-error comparator output for the purposes of providing a motion signal to the mixer amplifier 226. Furthermore, the last co-ordinate data which was read out from the tape reader determines the co-ordinate from which motion occurs in response to the feeler-transducer amplifier output.

When the printer prints the shaft position data in response to a feeler-transducer null signal, it also provides an output signal indicative of the fact that a printout has occurred. This output signal, which is designated as the printer-reset signal, excites a reset relay 276 in response to which the first and second relays 262, 264 are rendered inoperative and the feeler-transducer takeover 268 is rendered inoperative. This closes the normally closed contact 268-1 and 268-2 and opens the normally open contact 268-3. At this time, the machine-tool finds itself removed from a null position and promptly proceeds to return to that null position along the co-ordinate last selected for motion. The relays 262 and 264 operate as previously to indicate when the apparatus has attained the required position. At this time, an output advances the counter 266 to its fourth count state, whereby an output is provided to the reset apparatus 268 to initiate a new gauging cycle.

Not previously described is the operation of the feeler transducer with the proper attitude. With a multiple spindle head, each spindle holds a transducer having a different desired attitude. The spindle information is read from the tape reader into the spindle-selection storage register 206. The output of the spindle-selection storage is applied to a spindle comparator 280, to be compared with the output from a spindle encoder 282. This encoder is mounted on the multiple spindle head and provides an output representative of the spindle in position for gauging. The comparator applies the output representative of a difference, if any, to a spindle error sensor 284. The output of the error sensor is applied to the spindle motor 286, which rotates the multiple spindle head 288 until the comparator indicates that the head position is the one called for by the information in the spindle-selection storage register.

This apparatus may be equipped with the proper jogging buttons for enabling manual gauging operations to occur in the same manner as was previously described for the two-axis gauging system. The embodiment of the invention just described can be used for gauging dimensions at any point on the exterior of a workpiece and with the proper shaped sensing transducers can be used to determine hole centers or curve centers.

Another mode of operation for this apparatus may be used where the shape of the piece to be gauged permits. This is to record on the tape the actual co-ordinates which bring the feeler in contact with the piece being gauged. The dimensions printed as a result of the automatic gauging operation may be readily scanned for determining whether a part is within tolerances.

There has accordingly been described and shown herein a novel, useful automatic machine-part gauging apparatus which operates accurately, efficiently, and rapidly to effectuate the desired gauging operation.

I claim:

1. Apparatus for gauging the dimensions of an object comprising a table upon which said object is fastened, means for moving said table along each of different co-ordinate axes, a different positional transducer for indicating the position of said table along each of said co-ordinate axes from a reference position, a feeler transducer including means for producing an output signal until an object is contacted thereby, means for reducing said output signal to a null value with increasing pressure of said transducer on said object, and means for detecting when said feeler-transducer output signal attains a null, means for supporting said feeler transducer adjacent said table, means for establishing control signals for directing motion of said table by said means for moving said table to a desired location, means for applying said control signals to said means for moving said table, means responsive to said table reaching said desired location to apply said feeler-transducer output signal to said means for moving said table in place of said control signals to move said table until said feeler transducer contacts said object and thereafter until said transducer output signal attains a null, display means actuated responsive to a null indication by said means for detecting when said feeler-transducer output signal attains a null for displaying the position indicated by said different positional transducers, and means responsive to said display means being actuated for re-establishing the application of said control signals by said means for applying to said means for moving said table.

2. The improvement in an automatic machine tool of the type having a head for holding a tool and a table upon which a workpiece may be fastened, said table and head being relatively movable, said machine tool including separate means for each co-ordinate for moving said table to a desired location relative to said head, and a separate transducer for each co-ordinate for providing output signals representative of the location of said table relative to an origin point, said improvement comprising a feeler transducer fastened to said head, said feeler transducer including means for producing one output signal until an object is contacted thereby and for reducing said output signal with continuing increasing pressure of said transducer against said object, means responsive to said transducer output signals for detecting when said table reaches a desired location, normally inoperative means for moving said table responsive to said feeler-transducer output signal, means actuated by an output from said means for detecting for rendering operative said means for moving said table responsive to said feeler-transducer output signal, means for detecting when said feeler-transducer output signal attains a null and for providing a null-indicating signal, and means responsive to a null-indicating signal to provide an indication of said table location represented by output signals from each of said transducers for each co-ordinate.

3. The improvement in an automatic machine tool of the type having a head for holding a tool and a table upon which a workpiece may be fastened, said table and head being relatively movable, said machine tool including separate means for each co-ordinate for moving said table relative to said head, a separate transducer for each co-ordinate for providing output signals representative of the location of said table relative to an origin point, means for establishing signals representative of a location desired for said table, means for comparing said transducer output signals and the signals of said means for establishing, and means for controlling each of said separate means for moving said table responsive to the difference output of said means for comparing signals to move said table to said desired location, said improvement comprising a feeler transducer fastened to said head, said feeler transducer including means for producing an output signal until an object is contacted thereby and means for reducing said feeler transducer output signal to a null value with increasing pressure between said object and said feeler transducer, means for detecting when said table has reached a desired location represented by said means for establishing signals, means actuated by said means for detecting when said table has reached a desired location for applying said feeler-transducer output signal in place of output from said means for comparing signals to said means for controlling each of said separate means for moving said table whereby said table is moved responsive to said feeler-transducer output signal, means for detecting when said feeler output signal attains a null and providing a null-indicating signal, means responsive to said null-indicating signal to restore said means for comparing signal output in place of said feeler-transducer output to said means for controlling each of said separate means for moving said table, and means responsive to said null-indicating signal to provide an indication of said table location represented by the output signals from each of said transducers for each co-ordinate.

4. The improvement as recited in claim 3 wherein said head comprises a multiple spindle head each of which holds a feeler transducer having a different relative attitude, and there is included means for selecting a spindle head holding a feeler transducer having a desired attitude for gauging a workpiece.

References Cited by the Examiner
UNITED STATES PATENTS 2,736,101   2/56   Blume ___________________ 33—172
2,835,042   5/58   Tandler __________________ 33—174

OTHER REFERENCES

Control Engineering, Instrumentation & Automatic Control Systems, McGraw-Hill (January 1958).

ISAAC LISANN, *Primary Examiner.*